United States Patent
Skog (10) Patent No.: US 9,246,872 B2
(45) Date of Patent: Jan. 26, 2016

(54) METHODS AND ARRANGEMENTS FOR ENABLING DATA TRANSMISSION BETWEEN A MOBILE DEVICE AND A STATIC DESTINATION ADDRESS

(75) Inventor: Robert Skog, Hasselby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 336 days.

(21) Appl. No.: 13/989,118

(22) PCT Filed: Nov. 24, 2010

(86) PCT No.: PCT/SE2010/051297
§ 371 (c)(1),
(2), (4) Date: May 23, 2013

(87) PCT Pub. No.: WO2012/070990
PCT Pub. Date: May 31, 2012

(65) Prior Publication Data
US 2013/0238816 A1 Sep. 12, 2013

(51) Int. Cl.
*H04L 29/12* (2006.01)
*H04L 12/66* (2006.01)
(Continued)

(52) U.S. Cl.
CPC ........ *H04L 61/2007* (2013.01); *H04L 12/4625* (2013.01); *H04L 12/66* (2013.01); *H04L 29/12896* (2013.01); *H04L 61/106* (2013.01); *H04L 61/605* (2013.01); *H04W 4/005* (2013.01)

(58) Field of Classification Search
CPC ............... H04L 12/4625; H04L 12/66; H04L 29/12896; H04L 61/106; H04L 61/2007; H04L 61/605; H04W 4/005
USPC .......... 709/222, 223, 225; 370/401, 392, 437, 370/466; 718/1
See application file for complete search history.

(56) References Cited

U.S. PATENT DOCUMENTS 6,862,286 B1 3/2005 Tams et al.
7,372,868 B2 * 5/2008 Corwin .................... 370/463
(Continued)

FOREIGN PATENT DOCUMENTS

EP 1718033 A1 11/2006
WO 9913486 A2 3/1999
(Continued)

OTHER PUBLICATIONS

Extended European Search Report issued on Dec. 8, 2015 in EP Application No. 10860068.5, 7 pages.

*Primary Examiner* — Alina N Boutah
(74) *Attorney, Agent, or Firm* — Rothwell, Figg, Ernst & Manbeck, P.C.

(57) ABSTRACT

The embodiments of the present invention provide a solution for simplifying data transmission between a mobile device and a static destination address. This is achieved by introducing a new network node referred to as a VPC connector. The VPC connector is associated with a gateway of the operator network such as a GGSN. The VPC connector has access to a static first mapping between a subscriber identity associated with the mobile device and a static destination address to which the data from the mobile device should be sent. In order for the gateway to be able to route data from the mobile device to the correct static destination address, the gateway sends a dynamic second mapping between a temporary IP address of the mobile device and the subscriber identity associated with the mobile device to the network node referred to as the VPC connector. When the GGSN receives data from the temporary IP address of the mobile device, the GGSN requests information of the VPC address to which the GGSN should route that data. Since, the VPC connector can identify from which IP address the data is received, the VPC connector can then retrieve the VPC address by using the static first mapping and the dynamic second mapping.

25 Claims, 8 Drawing Sheets

(51) Int. Cl.
*H04L 12/46* (2006.01)
*H04W 4/00* (2009.01)

(56) References Cited

U.S. PATENT DOCUMENTS

| | | | | |
|---|---|---|---|---|
| 2002/0105955 A1* | 8/2002 | Roberts et al. | | 370/401 |
| 2003/0016679 A1* | 1/2003 | Adams et al. | | 370/401 |
| 2003/0129974 A1* | 7/2003 | Viitala | | 455/414 |
| 2003/0152042 A1* | 8/2003 | Soininen et al. | | 370/310 |
| 2003/0204617 A1* | 10/2003 | Buchsbaum et al. | | 709/236 |
| 2004/0196858 A1* | 10/2004 | Tsai et al. | | 370/401 |
| 2005/0243837 A1* | 11/2005 | Boyd et al. | | 370/395.52 |
| 2006/0080380 A1* | 4/2006 | Aizu et al. | | 709/203 |
| 2006/0276226 A1* | 12/2006 | Jiang | | 455/558 |
| 2007/0014301 A1* | 1/2007 | Miller et al. | | 370/401 |
| 2007/0019657 A1* | 1/2007 | Takayama | | 370/401 |
| 2007/0041355 A1* | 2/2007 | Shaw | | 370/351 |
| 2007/0171856 A1* | 7/2007 | Bruce et al. | | 370/328 |
| 2008/0019387 A1* | 1/2008 | Kim et al. | | 370/401 |
| 2008/0031257 A1* | 2/2008 | He | | 370/395.31 |
| 2008/0062891 A1* | 3/2008 | Van der Merwe et al. | | 370/254 |
| 2008/0263137 A1* | 10/2008 | Pattison et al. | | 709/203 |
| 2009/0049202 A1* | 2/2009 | Pattison et al. | | 709/249 |
| 2009/0061860 A1* | 3/2009 | Jiang | | 455/433 |
| 2009/0285227 A1* | 11/2009 | De Groote et al. | | 370/401 |
| 2009/0323636 A1* | 12/2009 | Dillon et al. | | 370/331 |
| 2010/0223378 A1* | 9/2010 | Wei | | 709/224 |
| 2011/0134769 A1* | 6/2011 | Lee et al. | | 370/252 |

FOREIGN PATENT DOCUMENTS

| | | |
|---|---|---|
| WO | 03065152 A2 | 8/2003 |
| WO | 2007008698 A2 | 1/2007 |
| WO | 2008102013 A2 | 8/2008 |

\* cited by examiner

METHODS AND ARRANGEMENTS FOR ENABLING DATA TRANSMISSION BETWEEN A MOBILE DEVICE AND A STATIC DESTINATION ADDRESS

CROSS-REFERENCE TO RELATED APPLICATION

This application is a 35 U.S.C. §371 National Phase Entry Application from PCT/SE2010/051297, filed Nov. 24, 2010, and designating the United States.

TECHNICAL FIELD

The embodiments of the present invention relates to methods and arrangements for enabling data transmission between a mobile device and a static destination address, and in particular to a simplified procedure for finding the static destination address.

BACKGROUND

Figure 1:
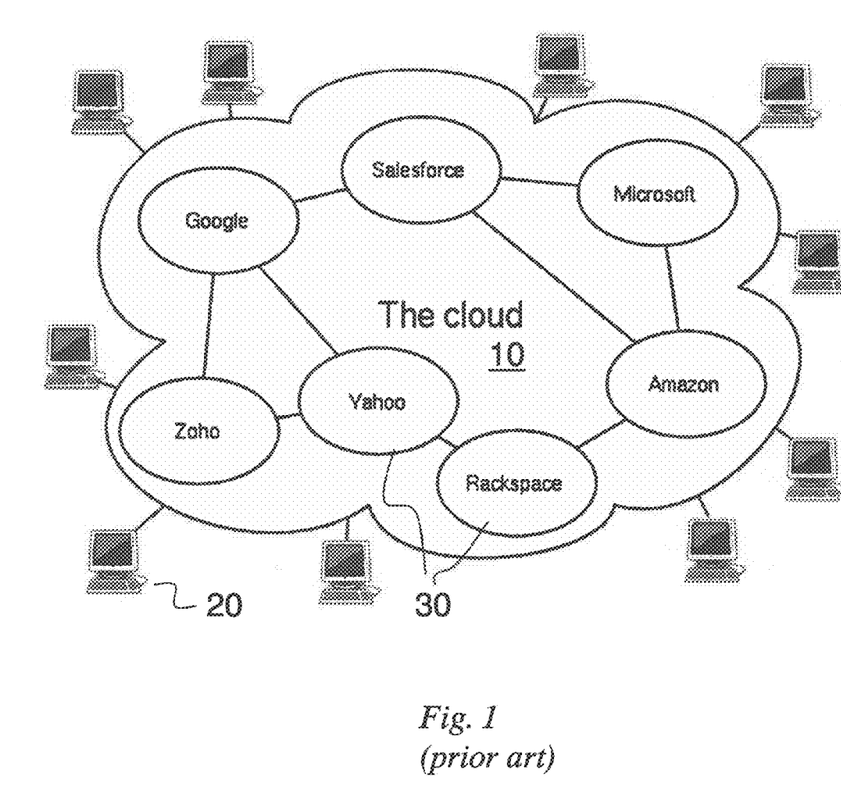
FIG. 1 illustrates one example of a cloud where several computers share different resources according to prior art.

Cloud computing is Internet-based computing, whereby shared resources, software, and information are provided to computers and other devices on demand, like the electricity grid. FIG. 1 illustrates one example of a cloud 10 where several computers 20 share different resources 30.

Cloud computing is a paradigm shift following the shift from mainframe to client-server in the early 1980s. Details are abstracted from the users, who no longer have need for expertise in, or control over, the technology infrastructure "in the cloud" that supports them. Cloud computing describes a new supplement, consumption, and delivery model for IT services based on the Internet, and it typically involves over-the-Internet provision of dynamically scalable and often virtualized resources.

Cloud computing is a model for enabling convenient, on-demand network access to a shared pool of configurable computing resources e.g., networks, servers, storage, applications, and services that can be rapidly provisioned and released with minimal management effort or service provider interaction.

"Cloud computing" is based on virtualization, which is a method of partitioning one physical server computer into multiple "virtual" servers, giving each the appearance and capabilities of running on its own dedicated machine.

To achieve a higher degree of security and control of the virtual resources the concept of "virtual private cloud" has been introduced. A Virtual Private Cloud (VPC) is a private cloud existing within a shared or public cloud.

Figure 2:
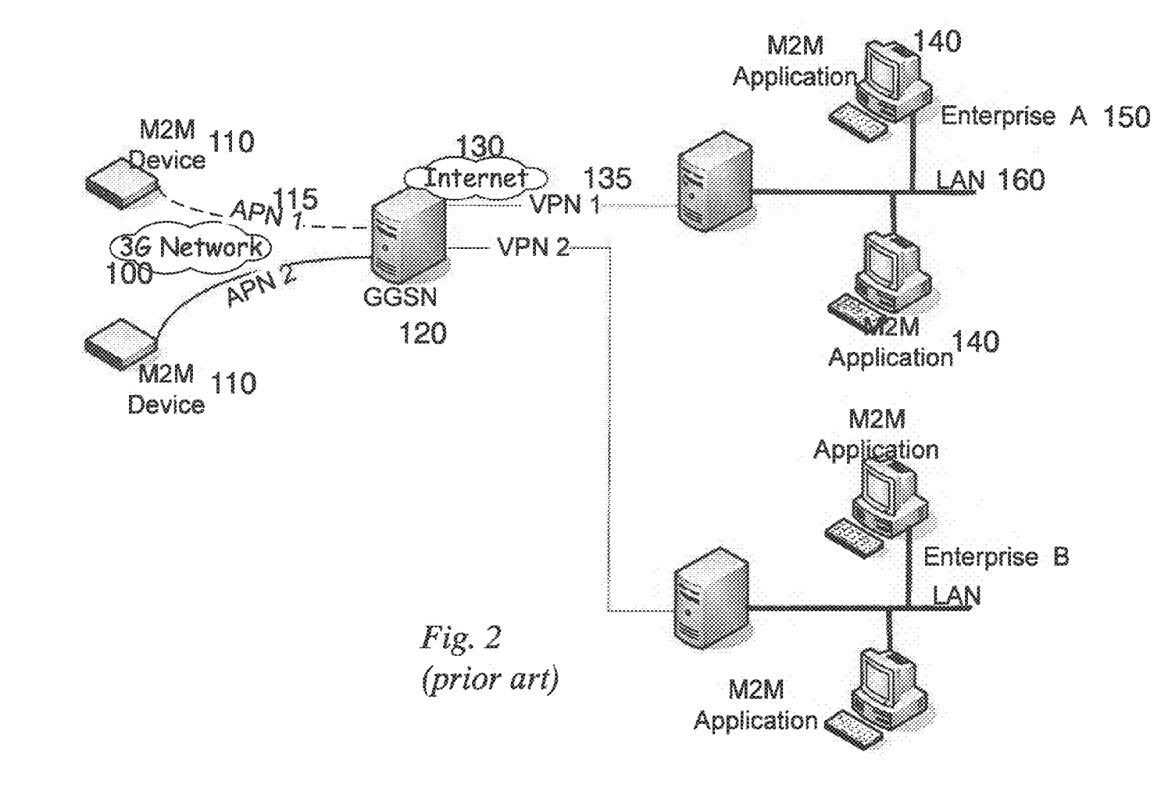
FIG. 2 illustrates VPN connections between M2M devices and M2M applications in enterprise networks according to prior art.

To set-up a VPN connection from a mobile operator to any existing enterprise network or a "cloud" takes time and is costly. A specific Access Point Name (APN) in the mobile devices is required, and it is also needed to configure the VPN between an operator and an enterprises. An operator gateway uses the APN for selecting which network to connect to. As an example, machine-to-machine (M2M) devices will connect to the enterprise network via a specific APN. This is illustrated in FIG. 2, where Machine-to-Machine (M2M) devices 115 of a 3G network 100 establish Virtual Private Network (VPN) connections 135 with which they can connect Local Area Networks (LAN) 160 of different enterprise networks 150. The M2M devices 110 are connected to the Internet via a gateway 120 referred to as a GPRS Gateway Support Node (GGSN) in accordance with the Access Point Name (APN) 115 of the M2M device 110. As stated the VPN connections 135 are established with which the M2M device can connect to the LAN of the respective enterprise networks 150. The M2M devices can then interact with M2M applications 140 as they are located on the LAN 160.

There are basically two ways a VPN can be set-up between a device and an enterprise Local Area Network (LAN):

1. A mobile device has been configured with an APN which points to the enterprise. An operator gateway, such as a GPRS Gateway Support Node, GGSN, will use this information to set-up a connection between the operator gateway and the enterprise. To do this, the operator gateway needs to exchange VPN parameters before the connection can be established. Examples of such parameters are address to an enterprise Dynamic Host Configuration Protocol (DHCP) server, Radius Server, VPN Gateway, and VPN credentials to encrypt and authenticate. The GGSN needs to be configured with this. The configuration and the parameter exchange are often manual work which takes time and is therefore costly.

2. A mobile device uses an APN which points to the Internet as the network to connect to. This is used for mobile devices that would like to reach internet and surf. No special behavior regarding provisioning of APN is needed. However, it is required to provision VPN parameters in the mobile device and the provisioning to mobile devices is "costly". Also the capacity demand on the mobile device increases when it has to encrypt/decrypt IP-packages and therefore a better Central Processing Unit (CPU) is required which increases the cost. In addition, since the CPU has to work harder due to the encryption/decryption, the CPU also drains the battery faster.

SUMMARY

The object of the embodiments of the present invention is to provide a solution for simplifying data transmission between a mobile device and a static destination address.

This is achieved by introducing a network node referred to as a VPC connector. The VPC connector is associated with a gateway of the operator network such as a GGSN. The VPC connector has access to a static first mapping between a subscriber identity associated with the mobile device and a static destination address to which data from the mobile device should be sent. The subscriber identity is stored on the SIM card inserted in the mobile device. The subscriber identity may be the MSISDN or the IMSI and the static destination address may be a VPC address. In order for the gateway to be able to route data from the mobile device to the correct static destination address, the gateway sends a dynamic second mapping between a temporary IP (Internet Protocol) address of the mobile device and the subscriber identity associated with the mobile device to the VPC connector.

When the gateway receives data from the IP address of the mobile device, the gateway requests information of the static destination address to which the GGSN should route that data. Since, the VPC connector can identify from which temporary IP address the data is received, the VPC connector can then retrieve the static destination address by using the static first mapping and the dynamic second mapping.

According to a first aspect of embodiments of the present invention, a method in a network node of an operator network for enabling data transmission between a mobile device and a static destination address is provided. The network node has access to a static first mapping between a subscriber identity associated with the mobile device and the static destination address to which the data from the mobile device should be sent. In the method, a gateway is provided with the static destination address to which the data from the mobile device should be sent, by using a dynamic second mapping between the subscriber identity associated with the mobile device and a temporary IP address of the mobile device and said first mapping such that the gateway can direct the data to the provided static destination address. The data is identified to be received from the temporary IP-address of the mobile device.

According to a second aspect of embodiments of the present invention, a network node for enabling data transmission between a mobile device and a static destination address is provided. The network node has access to a static first mapping between a subscriber identity associated with the mobile device and the static destination address to which the data from the mobile device should be sent. The network node comprises a provisioning unit configured to provide a gateway with the static destination address to which the data from the mobile device should be sent, by using a dynamic second mapping between the subscriber identity associated with the mobile device and a temporary IP address of the mobile device and said first mapping such that the gateway can direct the data to the provided static destination address. The data is identified to be received from the temporary IP-address of the mobile device.

According to a third aspect of embodiments of the present invention a method in a gateway of an operator network for enabling data transmission between a mobile device and a static destination address is provided. A network node associated with the gateway has access to a static first mapping between a subscriber identity associated with the mobile device and the static destination address to which the data from the mobile device should be sent. In the method, the static destination address to which the data from the mobile device should be sent is obtained from the network node, by using a dynamic second mapping between the subscriber identity associated with the mobile device and a temporary IP address of the mobile device and said first mapping enabling the gateway to direct the data to the provided static destination address, wherein the data is identified to be received from the temporary IP-address of the mobile device. In addition, data from the mobile device is directed to the received static destination address.

According to a fourth aspect of embodiments of the present invention, a gateway of an operator network for enabling data transmission between a mobile device and a static destination address is provided. A network node associated with the gateway has access to a static first mapping between a subscriber identity associated with the mobile device and the static destination address to which the data from the mobile device should be sent. The gateway comprises a receiver/transmitter unit configured to obtain the static destination address to which the data from the mobile device should be sent, by using a dynamic second mapping between the subscriber identity associated with the mobile device and a temporary IP address of the mobile device and said first mapping enabling the gateway to direct data, identified to be received from the temporary IP-address of the mobile device, to the provided static destination address. The gateway further comprises a router configured to direct the data from the mobile device to the received static destination address.

An advantage with embodiments of the present invention, is that the mobile operator can offer an execution platform appearing as a cloud for an enterprise customer that uses e.g. 3GPP radio access to reach the applications without the requirement to provision a specific APN or password in the M2M Device. According to embodiments of the present invention, the existing SIM-authentication can be re-used to find the correct static destination address for a specific M2M Device. Further, it is assumed that the operator domain is secure for sending packets within the network. This results in that the operators can save time and money, since no further authentication has to be performed and further configuration and parameter exchange can be avoided.

A further advantage with embodiments of the present invention is that the solution is protocol agnostic.

A yet further advantage with embodiments of the present invention is that the mobile devices can be provided with dynamic addresses, also referred to as temporary addresses.

DETAILED DESCRIPTION

The embodiments of the present invention will be described more fully hereinafter with reference to the accompanying drawings, in which preferred embodiments of the invention are shown. The embodiments may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current embodiments are primarily described in the fog in of methods and devices, the embodiments may also be embodied in a computer program product as well as a system comprising a computer processor and a memory coupled to the processor, wherein the memory is encoded with one or more programs that may perform the functions disclosed herein.

The embodiments of the present invention relate to methods and arrangements for enabling data transmission between a mobile device and a static destination address. This is achieved by introducing a network node and to re-use the existing SIM-authentication to find a static destination address to which the data from the mobile device should be sent.

In this specification, the mobile device is exemplified by a M2M device, such as a coffee machine or a refrigerator which can interact with an application at the service provider in an enterprise network. The connection to the application, e.g. a VPN connection, is provided over a wireless network such as a 2G, 3G or 4G network. Accordingly, the connection between the M2M device and M2M Application where the M2M Application can be executed in a "cloud environment" may be a VPN connection, but additional encryption for the connection is not required since the SIM-authentication is performed which imply a secure connection. If any additional encryption should be used such an encryption can be done on the application level.

Furthermore, each mobile device has a Subscriber Identity Module (SIM) card which is associated with a static destination address, i.e. the address of the application at the service provider in the enterprise network to which the mobile device should connect. Hence, for example, a coffee machine comprising a SIM card can connect to an application in the network of coffee provider.

When the coffee machine and the application interact, the coffee provider can monitor the condition of the coffee machine and detect when e.g. more coffee must be provided or when maintenance is required.

In order to simplify the procedure to set up a connection, the operators' Subscriber Identity Module (SIM)-authentication is re-used to find the address to which data packets from a mobile device should be routed and to which the mobile device should establish the connection. The SIM comprises subscriber information e.g. different keys used for authentication and different subscriber identities such as IMSI and the SIM is issued and controlled by the operator. The SIM-card may either be a physical SIM-card or an equivalent SIM function based on software, i.e. no physical card. As stated above, the SIM of e.g. an M2M device is also associated with the static destination to which the data from the M2M device should be sent.

The simplified procedure is achieved by introducing a network node referred to as a Virtual Private Cloud (VPC) connector which is a part of the operator domain. Based on information retrieved from the conventional SIM-authentication, the VPC connector can identify the address to which data packets from a mobile device should be routed.

Figure 3:
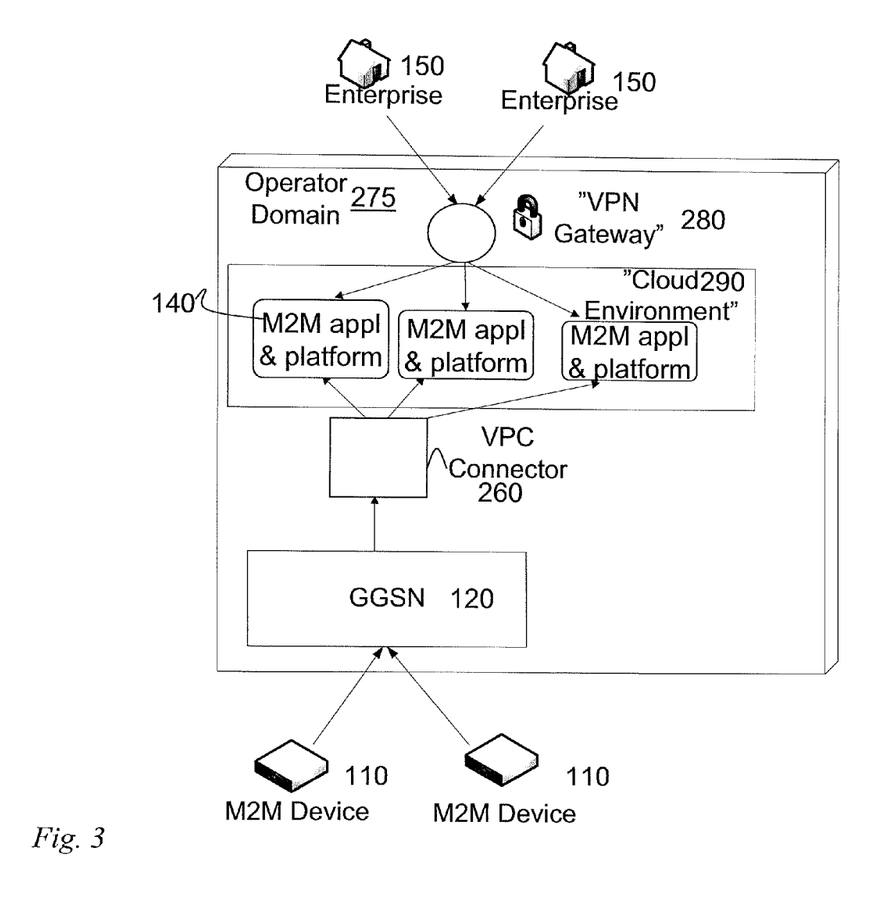
FIG. 3 illustrates a VPC connector in an operator domain according to embodiments of the present invention.

The VPC connector is shown in FIG. 3, where it is illustrated that the VPC connector 260 is connected between a gateway 120 of the operator network 275 and the cloud environment 290. The network is in this specification exemplified by a mobile network (e.g. a 2G, 3G or 4G network), wherein the mobile devices 110 (exemplified by M2M devices) are wirelessly connected to the gateway 120 of the network via base stations (not shown). According to embodiments of the present invention, the VPC connector 260 is configured to store a static first mapping between the each subscriber identity of the mobile devices and the static destination address 140 that the data from the respective mobile device should be sent to. The enterprises 150 can access their own cloud environment 290 via a VPN gateway 280 in this example.

Figure 4:
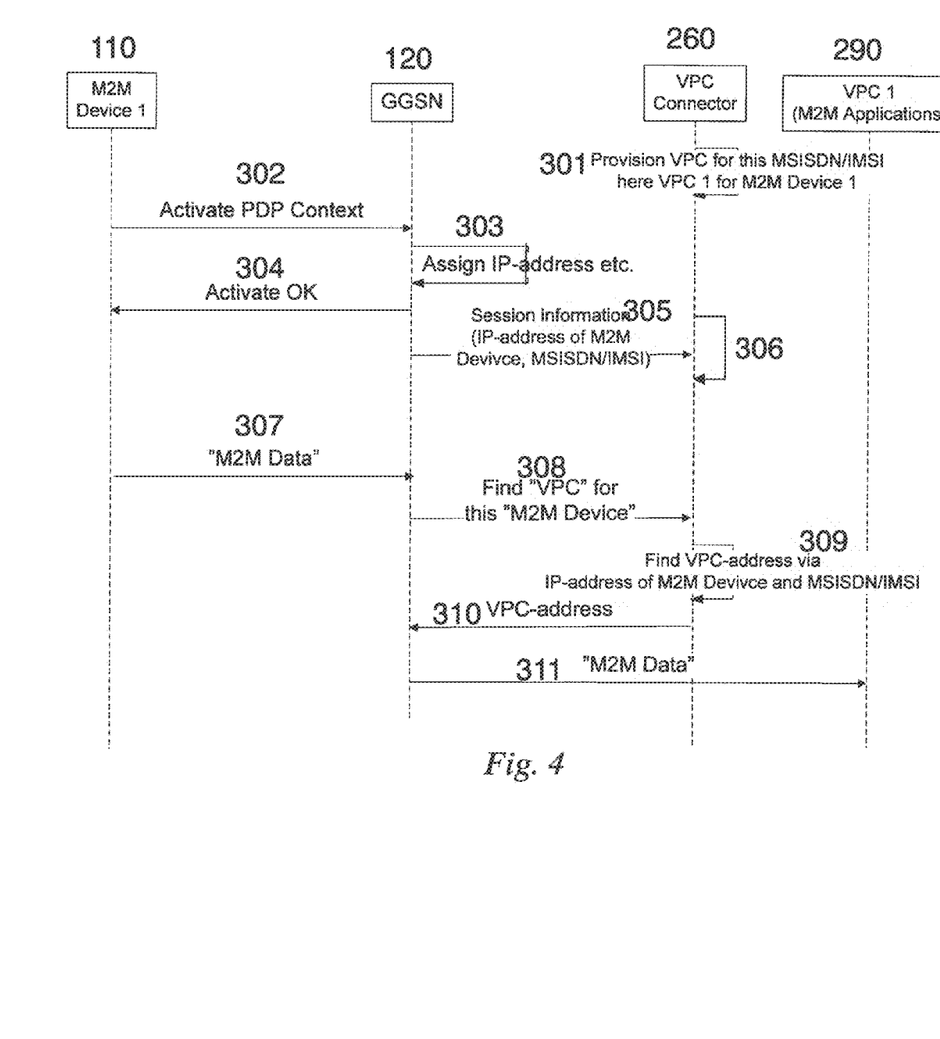
FIGS. 4-5 are sequence diagrams of the method according to embodiments of the present invention.
Figure 5:
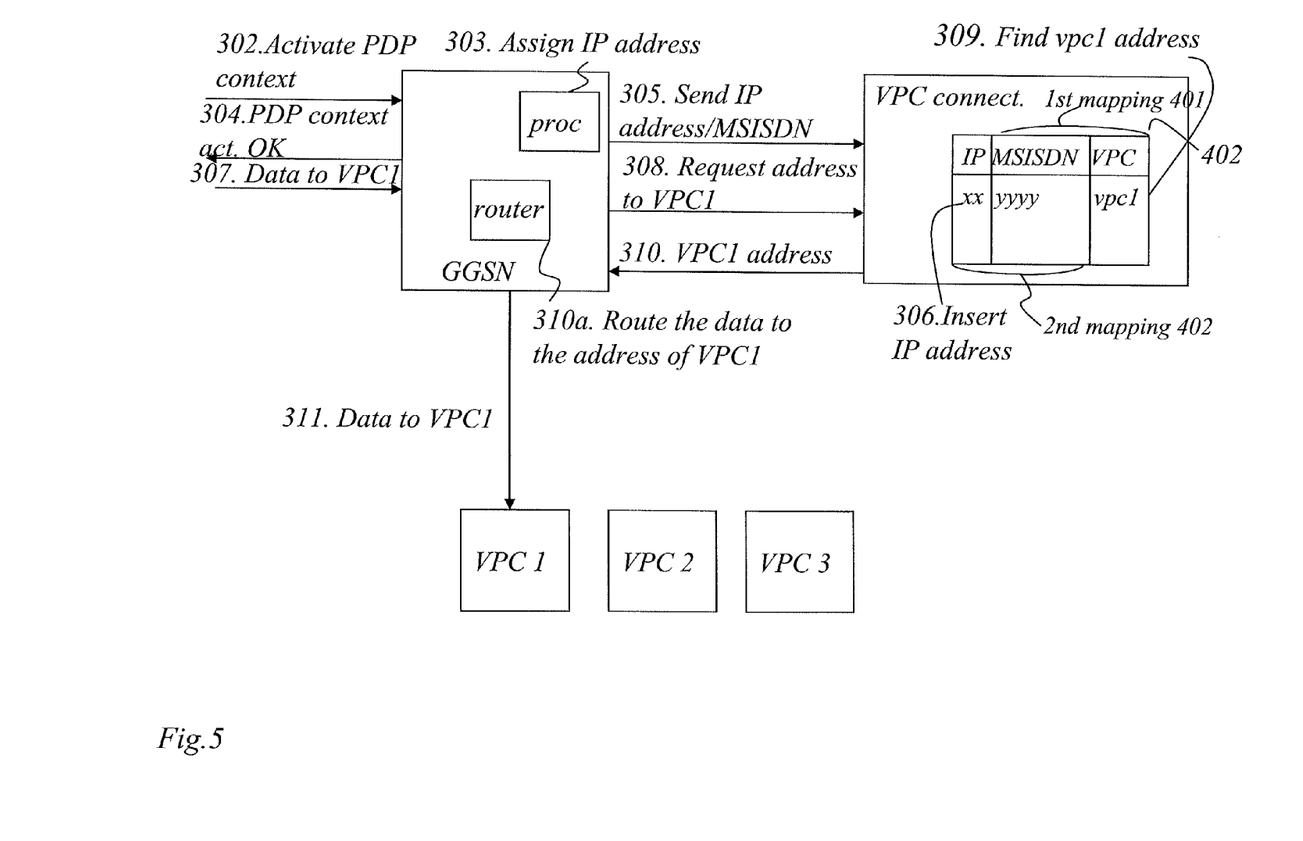

Referring now to a scenario illustrated in FIGS. 4 and 5, where a VPC connector 260 is provided 301 with a static first mapping 401 between a subscriber identity and a static destination to which data from the subscriber of the subscriber identity should be sent. The subscriber identity is available on the SIM card of the subscriber.

As illustrated in the sequence diagrams of FIGS. 4 and 5, a mobile device exemplified as an M2M device 110 establishes an initial data connection with the network via the gateway, exemplified as a Gateway GPRS Support Node (GGSN) 120 by using an activate PDP context procedure 302. During the PDP context activation procedure 302, the mobile device is authenticated to the operator network by using information stored on the SIM card e.g. in accordance with conventional methods. The mobile device is also assigned 303 a temporary IP address to be used for IP communication. A confirmation that the PDP context activation procedure is properly set up is sent 304 by the gateway to the mobile device.

When the temporary IP addressed is assigned to the mobile device and the confirmation is sent, the gateway sends 305 session information to the VPC connector 260. The session information comprises the assigned IP addressed associated with the subscriber identity of the SIM of the mobile device.

Thus, the VPC connector stores 306 a dynamic second mapping 402 between the temporary IP address and the subscriber identity, wherein the subscriber identity is the same type of subscriber identity used in the static first mapping. By means of the subscriber identity in the second mapping, a table comprising an association between the temporary IP address, the subscriber identity and the static destination address is stored in the VPC connector. In this way, the VPC connector has an association between the temporary IP address and the static destination address. It should be noted that the temporary IP address will be replaced with another temporary IP address when the mobile device disconnects and connects again. The table is shown in FIG. 5.

Now, the mobile device has an established IP connection with the network and the mobile device can start sending 307 data to its application. When the gateway of the network receives data from the mobile device, the gateway receives also information of the IP-address from which the data origins. Then, the gateway sends 308 a request to the VPC connector to find the static destination address for the mobile device. In the request, the gateway includes the IP address from which the data origins. Accordingly, the VPC connector is configured to investigate 309 the table to find the static destination address based on the IP address. When the VPC connector has found the static destination address, it transmits 310 the static destination address to the gateway. Now the gateway knows to which static destination address it should route the data packets, which implies that data packets can be sent 311 to the static destination address.

It should be noted that when the mobile device deactivates the PDP context i.e. removes the connection, the temporary IP-address in the second mapping will be set to "zero" while the static first mapping will still be the same as before.

As mentioned above, the mobile device may be an M2M device communicating with an application of an enterprise in a virtual private cloud (VPC), i.e. the application is a part of the cloud. Therefore in such a scenario, the static destination address is a static VPC address.

Further, examples of subscriber identity types that may be used are International Mobile Subscriber Identity (IMSI) and Mobile Subscriber Integrated Services Digital Network Number (MSISDN). It is however required that the same type of subscriber identity is used for the first and the second mapping. It should be noted that the gateway may comprise a memory to store the second mapping which would result in that the number requests to the VPC connector can be avoided.

By using the embodiments of the present invention, the procedure for establishing a connection between an M2M device and its static VPC address is simplified, since no additional authentication is required.

Figure 6:
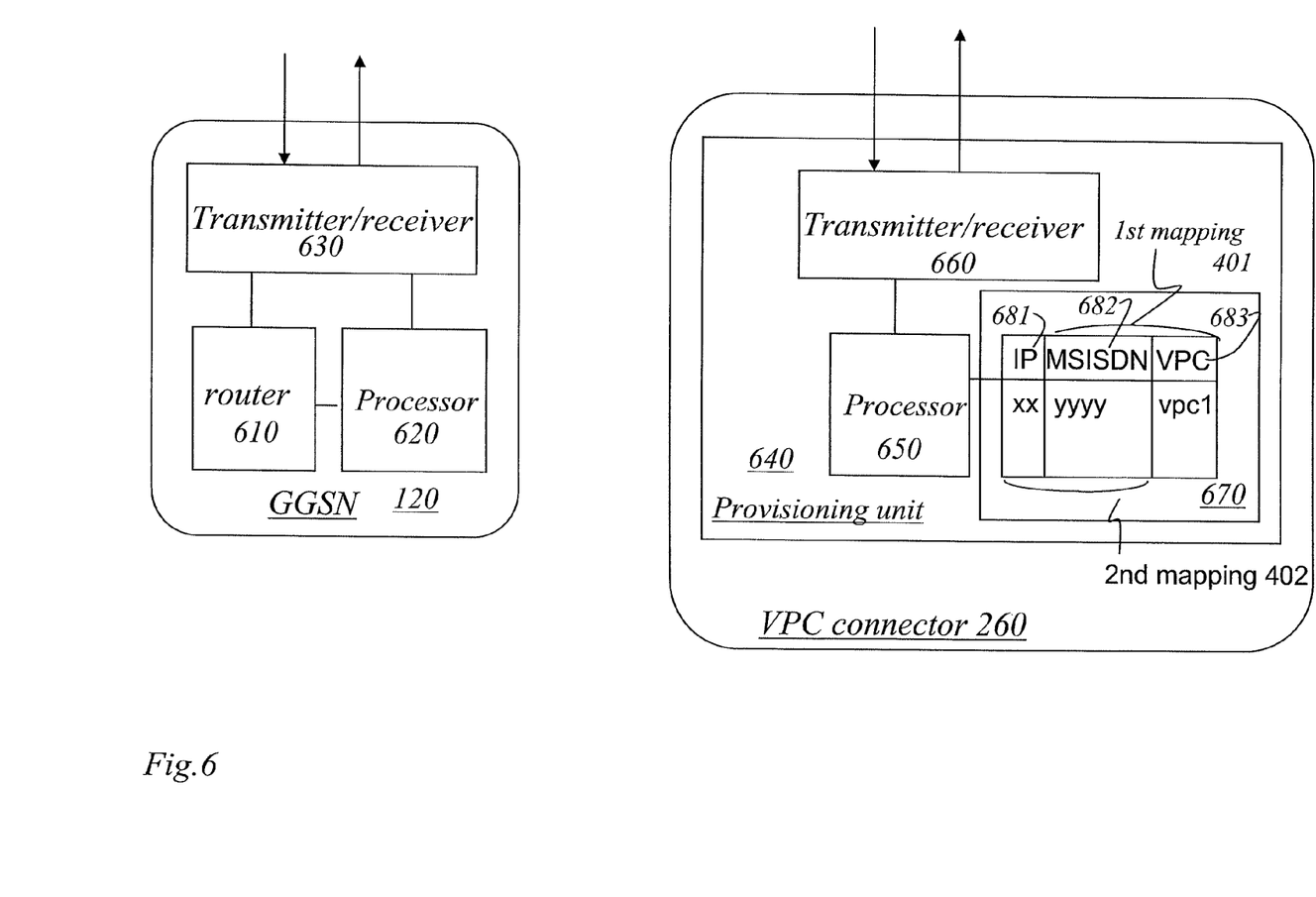
FIGS. 6-8 are flowcharts of the method according to embodiments of the present invention.

Turning now to FIG. 6 showing a gateway and a network node referred to as VPC connector according to embodiments of the present invention.

The network node 260 is referred to as a VPC connector and the VPC connector is configured to establish a connection between a mobile device and a static destination address. The network node has access to a static first mapping 401 between a subscriber identity 682 associated with the mobile device and the static destination address 683 to which the data from the mobile device should be sent. Thus, this static first mapping may be performed by the provisioning unit 640 below, implying that the provisioning unit may be configured to perform said static first mapping. The network node 260 comprises a provisioning unit 640 configured to provide a gateway with the static destination address 683 to which the data from the mobile device should be sent. The provisioning unit 640 achieves that by using a dynamic second mapping 402 between the subscriber identity 682 associated with the mobile device and a temporary IP address 681 of the mobile device and said first mapping 401 such that the gateway can direct data to the provided static destination address.

The data is identified to be received from the temporary IP-address 681 of the mobile device.

Therefore, the provisioning unit 640 further comprises a receiver/transmitter unit 660 configured to receive a temporary IP address of the mobile device from a gateway of the network upon establishment of an initial connection between the mobile device and the network, wherein the mobile device is identifiable by the subscriber identity. The provisioning unit 640 further also a processing unit 650 configured to map the received temporary IP-address 681 with the subscriber identity 682 of the mobile device, in the dynamic second mapping 402, wherein the receiver/transmitter unit 660 is further configured to receive from the gateway a request to find the static destination address for data from the mobile device identified by the temporary IP address. The processing unit 650 is further configured to find the static destination address via the dynamic second mapping and the static first mapping, and the network node 260 further comprises a receiver/transmitter unit 660 configured to send the found static destination address 683 to the gateway.

As illustrated in FIG. 6, the network node may comprise a memory 670 for storing the static first mapping 401 and the dynamic second mapping 402.

The network node may be included in the gateway 120 which is exemplified by the GGSN.

Moreover, the gateway 120 comprises a receiver/transmitter unit 630 configured to obtain the static destination address to which the data from the mobile device should be sent. This is done by using a dynamic second mapping between the subscriber identity associated with the mobile device and a temporary IP address of the mobile device and said first mapping enabling the gateway to direct data to the provided static destination address. A processor 620 is configured to identify the data that it is received from the temporary IP-address of the mobile device. Further, the gateway 120 comprises a router 610 configured to direct the data from the mobile device to the received static destination address.

According to a further embodiment, the receiver/transmitter unit 630 is further configured to send to the network node the temporary IP address of the mobile device upon establishment of an initial connection between the mobile device and the network associated with the subscriber identity of the mobile device, to receive data from the mobile device being identifiable by the temporary IP address, and to send a request to find the static destination address for the data of the mobile device.

The gateway 120 may comprise the network node 260. Further the gateway may be a GGSN or a Public Data Network gateway in Long Term Evolution networks.

Figure 7:
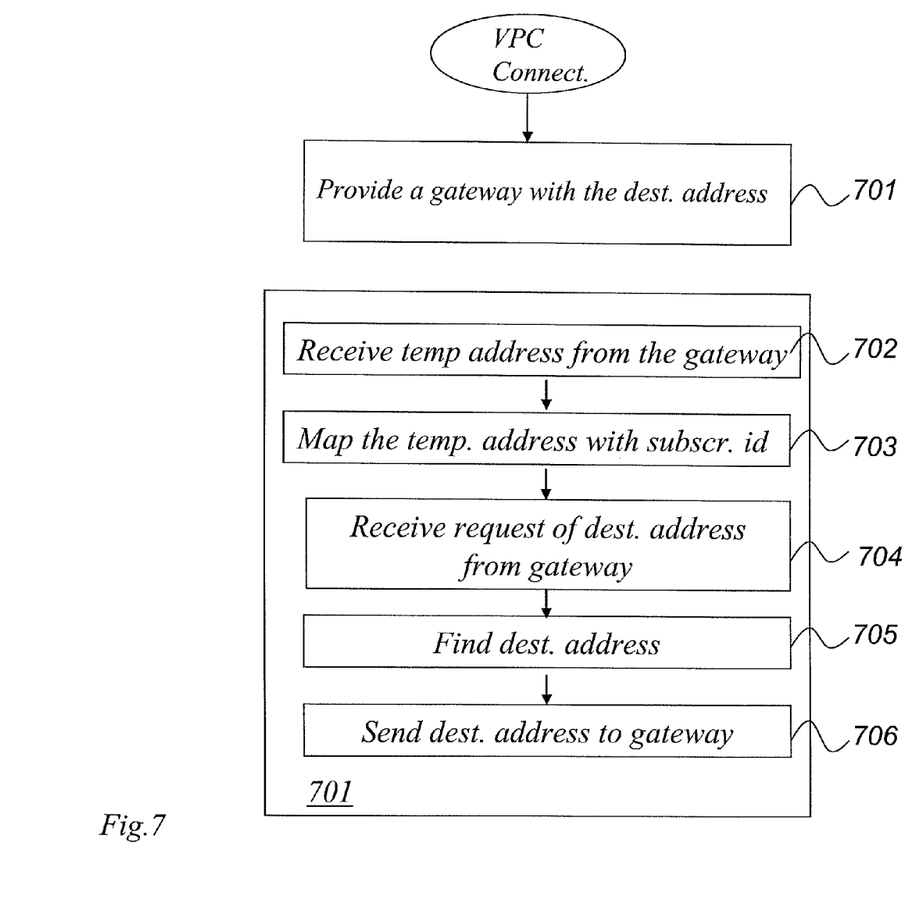

As illustrated in FIG. 7, a method in a network node of an operator network for enabling data transmission between a mobile device and a static destination address is provided in accordance with embodiments of the present invention. The network node has access to a static first mapping between a subscriber identity associated with the mobile device and the static destination address to which the data from the mobile device should be sent. In the method, a gateway is provided 701 with the static destination address to which the data from the mobile device should be sent. That is achieved by using a dynamic second mapping between the subscriber identity associated with the mobile device and a temporary IP address of the mobile device and said first mapping such that the gateway can direct data to the provided static destination address. The data is identified to be received from the temporary IP-address of the mobile device.

According to a further embodiment, the providing step further comprises receiving 702 a temporary IP address of the mobile device from a gateway of the network upon establishment of an initial connection between the mobile device and the network, wherein the mobile device is identifiable by the subscriber identity, mapping 703 the received temporary IP-address with the subscriber identity of the mobile device, in the dynamic second mapping, receiving 704 from the gateway a request to find the static destination address for data from the mobile device identified by the IP address, finding 705 the static destination address via the dynamic second mapping and the static first mapping, and sending 706 the found static destination address to the gateway.

Figure 8:
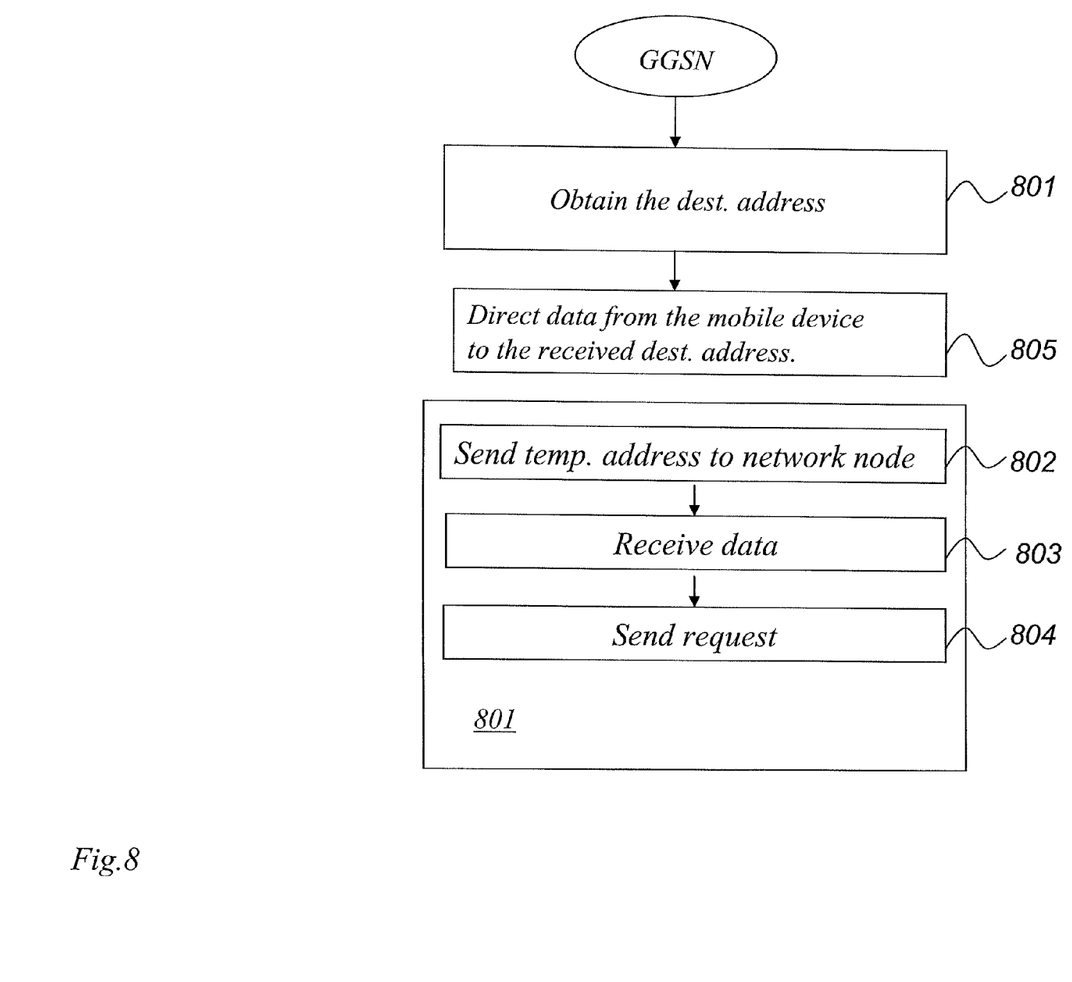

According to a further aspect, a method in a gateway of an operator network for enabling data transmission between a mobile device and a static destination address is provided. A network node is associated with the gateway has access to a static first mapping between a subscriber identity associated with the mobile device and the static destination address to which the data from the mobile device should be sent. In the method, the static destination address to which the data from the mobile device should be sent is obtained 801 from the network node. That is achieved by using a dynamic second mapping between the subscriber identity associated with the mobile device and a temporary IP address of the mobile device and said first mapping enabling the gateway to direct data, identified to be received from the temporary IP-address of the mobile device, to the provided static destination address. Data is then directed 805 from the mobile device to the received static destination address.

According to one embodiment, the obtaining step 801 further comprises sending 802 to the network node the temporary IP address of the mobile device upon establishment of an initial connection between the mobile device and the network associated with the subscriber identity of the mobile device, receiving 803 data from the mobile device being identifiable by the temporary IP address, and sending 804 a request to find the static destination address for the data of the mobile device.

Modifications and other embodiments of the disclosed invention will come to mind to one skilled in the art having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a network node of an operator network for enabling data transmission between a mobile device and a static destination address, wherein the network node has access to a static first mapping between a subscriber identity associated with the mobile device and the static destination address to which data from the mobile device should be sent, the method comprising providing a gateway with the static destination address to which the data from the mobile device should be sent, by using a dynamic second mapping between the subscriber identity associated with the mobile device and a temporary IP address of the mobile device and said first mapping such that the gateway can direct the data, identified to be received from the temporary IP-address of the mobile device, to the provided static destination address.

2. The method according to claim 1, wherein the providing step further comprises:
- receiving a temporary IP address of the mobile device from a gateway of the network upon establishment of an initial connection between the mobile device and the network, wherein the mobile device is identifiable by the subscriber identity,
- mapping the received temporary IP-address with the subscriber identity of the mobile device, in the dynamic second mapping,
- receiving from the gateway a request to find the static destination address for data from the mobile device identified by the IP address,
- finding the static destination address via the dynamic second mapping and the static first mapping, and
- sending the found static destination address to the gateway.

3. The method according to claim 1, wherein the mobile device is a machine-to-machine device.

4. The method according to claim 1, wherein the network node is included in the gateway.

5. The method according to claim 1, wherein the gateway is a GPRS Gateway Support Node, GGSN or a public data network gateway.

6. The method according to claim 1, wherein the subscriber identity is an International Mobile Subscriber Identity, IMSI, or Mobile Subscriber Integrated Services Digital Network Number, MSISDN.

7. The method according to claim 1, wherein the static destination address is an EP-address.

8. The method according to claim 7, wherein the static IP-address is virtual private cloud IP-address.

9. A network node for enabling data transmission between a mobile device and a static destination address, wherein the network node has access to a static first mapping between a subscriber identity associated with the mobile device and the static destination address to which the data from the mobile device should be sent, the network node comprising a provisioning unit configured to provide a gateway with the static destination address to which the data from the mobile device should be sent, by using a dynamic second mapping between the subscriber identity associated with the mobile device and a temporary IP address of the mobile device and said first mapping such that the gateway can direct the data, identified to be received from the temporary IP-address of the mobile device, to the provided static destination address.

10. The network node according to claim 9, wherein the provisioning unit comprises a receiver/transmitter unit 660 configured to receive a temporary IP address of the mobile device from a gateway of the network upon establishment of an initial connection between the mobile device and the network, wherein the mobile device is identifiable by the subscriber identity, a processing unit configured to map the received temporary IP-address with the subscriber identity of the mobile device, in the dynamic second mapping, wherein the receiver/transmitter unit is further configured to receive from the gateway a request to find the static destination address for data from the mobile device identified by the temporary IP address and the processing unit is further configured to find the static destination address via the dynamic second mapping and the static first mapping, and the receiver/transmitter unit is further configured to send the found static destination address to the gateway.

11. The network node according to claim 9, wherein the network node comprises a memory for storing the first mapping and the second mapping.

12. The network node according to claim 9, wherein the mobile device is a machine-to-machine device.

13. The network node according to claim 9, wherein the network node is included in the gateway.

14. The network node according to claim 9, wherein the gateway is a GPRS Gateway Support Node, GGSN or a public data network gateway.

15. The network node according to claim 9, wherein the subscriber identity is an International Mobile Subscriber Identity, IMSI, or Mobile Subscriber Integrated Services Digital Network Number, MSISDN.

16. The network node according to claim 9, wherein the static destination address is an IP-address.

17. The network node according to claim 16, wherein the static IP-address is virtual private cloud IP-address.

18. A method in a gateway of an operator network for enabling data transmission between a mobile device and a static destination address, wherein a network node associated with the gateway has access to a static first mapping between a subscriber identity associated with the mobile device and the static destination address to which the data from the mobile device should be sent, the method comprising:
- obtaining from the network node the static destination address to which the data from the mobile device should be sent, by using a dynamic second mapping between the subscriber identity associated with the mobile device and a temporary IP address of the mobile device and said first mapping enabling the gateway to direct data, identified to be received from the temporary IP-address of the mobile device, to the provided static destination address, and
- directing the data from the mobile device to the received static destination address.

19. The method according to claim 18, wherein the obtaining step further comprises:
- sending to the network node the temporary IP address of the mobile device upon establishment of an initial connection between the mobile device and the network associated with the subscriber identity of the mobile device,
- receiving data from the mobile device being identifiable by the temporary IP address, and
- sending a request to find the static destination address for the data of the mobile device.

20. The method according to claim 18, wherein the gateway comprises the network node.

21. The method according to claim 18, wherein the gateway is a GPRS Gateway Support Node, GGSN or a public data network gateway.

22. A gateway of an operator network for enabling data transmission between a mobile device and a static destination address, wherein a network node associated with the gateway has access to a static first mapping between a subscriber identity associated with the mobile device and the static destination address to which the data from the mobile device should be sent, the gateway comprises a processor configured to obtain the static destination address to which the data from the mobile device should be sent, by using a dynamic second mapping between the subscriber identity associated with the mobile device and a temporary IP address of the mobile device and said first mapping enabling the gateway to direct data, identified to be received from the temporary IP-address of the mobile device, to the provided static destination address, and a router configured to direct the data from the mobile device to the received static destination address.

23. The gateway according to claim 22, wherein the processor further is configured to send to the network node the temporary IP address of the mobile device upon establishment of an initial connection between the mobile device and the network associated with the subscriber identity of the mobile device, to receive data from the mobile device being identifiable by the temporary IP address, and to send a request to find the static destination address for the data of the mobile device.

24. The gateway according to claim 22, wherein the gateway comprises the network node.

25. The gateway according to claim 22, wherein the gateway is a GPRS Gateway Support Node, GGSN or a public data network gateway.

* * * * *